United States Patent
Lewis et al.

(10) Patent No.: US 6,285,657 B1
(45) Date of Patent: Sep. 4, 2001

(54) SYSTEM AND METHOD OF SCHEDULING DATA CELLS BASED UPON SUSTAINABLE CELL RATE AND PEAK CELL RATE OVER A VARIABLE BANDWIDTH CHANNEL

(75) Inventors: Ronald C. Lewis; Henry M. Mahler, both of Huntsville, AL (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/406,965

(22) Filed: Sep. 28, 1999

(51) Int. Cl.[7] ............................... H04J 1/16; H04J 3/16; H04L 12/28
(52) U.S. Cl. ........................ 370/230; 370/385; 370/468
(58) Field of Search ..................... 370/395, 397, 370/399, 468, 418, 229, 230, 253, 232–236, 412, 473, 474

(56) References Cited

U.S. PATENT DOCUMENTS

| | | | |
|---|---|---|---|
| 5,392,280 | * | 2/1995 | Zheng ................................. 370/235 |
| 5,742,765 | * | 4/1998 | Wong et al. ......................... 370/465 |
| 5,745,694 | * | 4/1998 | Egawa et al. ....................... 370/468 |
| 5,796,735 | * | 8/1998 | Miller et al. ........................ 370/395 |
| 5,917,828 | * | 6/1999 | Thompson .......................... 370/474 |
| 5,956,344 | * | 9/1999 | Cole .................................... 370/465 |
| 5,982,748 | * | 11/1999 | Yin et al. ............................. 370/232 |
| 5,987,031 | * | 11/1999 | Miller et al. ........................ 370/412 |
| 6,058,114 | * | 5/2000 | Sethuram et al. ................... 370/397 |
| 6,137,779 | | 10/2000 | Miller et al. ........................ 370/236 |

OTHER PUBLICATIONS

*ATM Chips and Products*, Mika Lepisto, Jan. 25, 1995.
*RS8228: Octal ATM Transmission Convergence PHY Device*, Conexant Systems, Inc., ©1998.
*Rockwell's Network Access Division Upgrades ATM SAR Controller Chip, Reports Success of Traffic–Management Architecture*, Conexant Systems, Inc., ©1998.
*ATM Congestion Control*, Fang Lu, Aug. 21, 1995.
*Customer–Premises ATM NTUs*, RAD Communications Ltd.; ©1999.
*Bt8230 ATM Segmentation and Reassembly ControllerSAR*, Rockwell Semiconductor Systems, Inc., ©1998.
*RS8235 Endstation ATM xBR Service Segmentation and Reassembly Controller*, Conexant Systems, Inc., ©1998.
*ATM in Europe: The User Handbook*, European Market Awareness Committee, Jul. 1997.
*ATM: Practical Implementations Here and Now, 3Com Corporation*, ©1996.
*(BW) (Rockwell–Semiconductor)(ROK) Rockwell Semiconductor Systems Unveils ATM and HDSL Chip Solutions at Networld+Interop*, Business Editors and High–Tech Writers, Networld+Interop98, May 4, 1998.

* cited by examiner

Primary Examiner—Melvin Marcelo
Assistant Examiner—Chiho Andrew Lee
(74) Attorney, Agent, or Firm—Akin, Gump, Strauss, Hauer & Feld, L.L.P.

(57) ABSTRACT

A technique of allocating data cells by a segmentation and reassembly (SAR) controller for transmission on a network connection such as an asynchronous transfer mode (ATM) network connection provides a scaleable sustainable cell rate (SCR) when the sum of the SCRs of virtual circuit exceeds the connection bandwidth. In addition, bandwidth can be shifted from a VC which is using less than its allocated SCR to a VC that is exceeding its SCR. In addition, the method enables a VC to exceed it peak cell rate (PCR) to some extent. The method and system of the disclosed embodiment can also be employed to dynamically adjust SCRs and PCRs in a variable bandwidth channel and is programmable and thus more flexible and less expensive than possible hardware solutions.

26 Claims, 14 Drawing Sheets

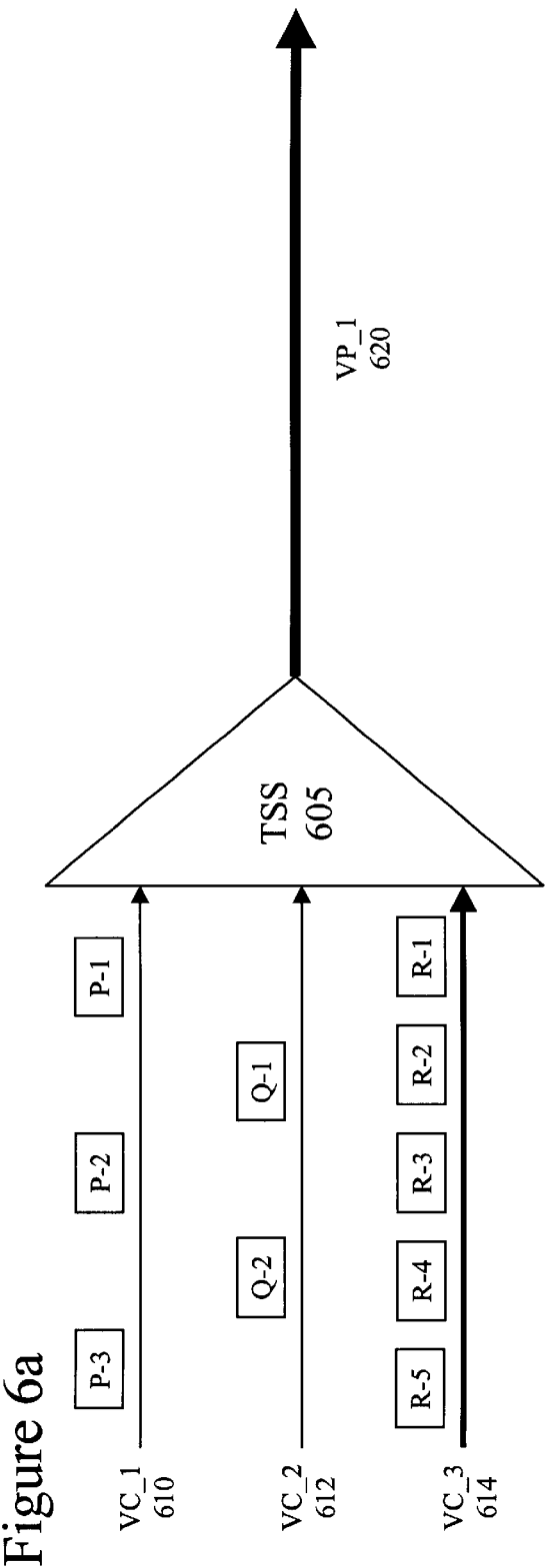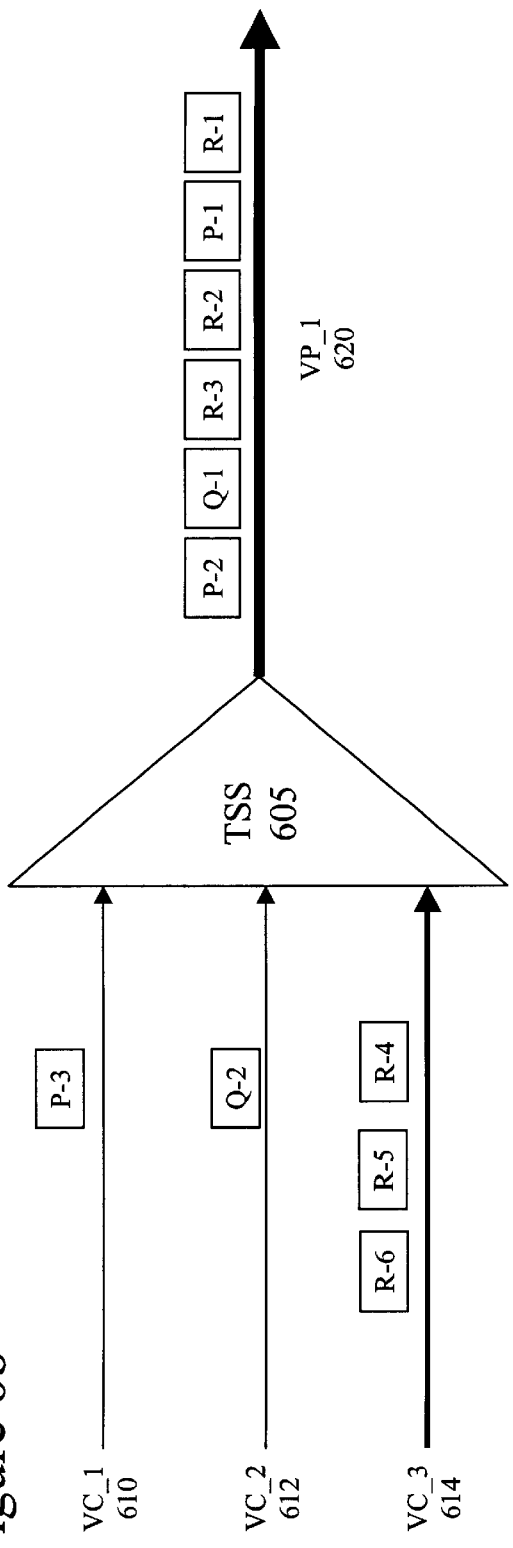

| | VC_1 (STEP SIZE = 0.2) | ROW | VC_2 (STEP SIZE = 0.3) | ROW | VC_3 (STEP SIZE = 0.5) | ROW |
|---|---|---|---|---|---|---|
| 1 | 0.2 → 0.4 | - | 0.3 → 0.6 | - | 0.5 → 1.0 | - |
| 2 | 0.4 → 0.6 | - | 0.6 → 0.9 | - | 1.0 → 0.0 → 0.5 | 1 |
| 3 | 0.6 → 0.8 | - | 0.9 → 1.2 | - | 0.5 → 1.0 | - |
| 4 | 0.8 → 1.0 | - | 1.2 → 0.2 → 0.5 | 2 | 1.0 → 0.0 → 0.5 | 3 |
| 5 | 1.0 → 0.0 → 0.2 | 4 | 0.5 → 0.8 | - | 0.5 → 1.0 | - |
| 6 | 0.2 → 0.4 | - | 0.8 → 1.1 | - | 1.0 → 0.0 → 0.5 | 5 |
| 7 | 0.4 → 0.6 | - | 1.1 → 0.1 → 0.4 | 6 | 0.5 → 1.0 | - |
| 8 | 0.6 → 0.8 | - | 0.4 → 0.7 | - | 1.0 → 0.0 → 0.5 | 7 |
| | 0.8 → 1.0 | | 0.7 → 1.0 | | 0.5 → 1.0 | |
| | 1.0 → 0.0 → 0.2 | 8 | 1.0 → 0.0 → 0.3 | 9 | 1.0 → 0.0 → 0.5 | 10 |

| ROW | VC |
|---|---|
| 1 | VC_3 |
| 2 | VC_2 |
| 3 | VC_3 |
| 4 | VC_1 |
| 5 | VC_3 |
| 6 | VC_2 |
| 7 | VC_3 |
| 8 | VC_1 |
| 9 | VC_2 |
| 10 | VC_3 |

| | VC_1 (STEP SIZE = 0.3) | SEND ? | VC_2 (STEP SIZE = 0.4) | SEND ? | VC_3 (STEP SIZE = 0.8) | SEND ? |
|---|---|---|---|---|---|---|

Every VC has data to send

| | VC_1 | SEND? | VC_2 | SEND? | VC_3 | SEND? |
|---|---|---|---|---|---|---|
| 1 | 1.0 → 1.3 | - | 1.0 → 1.4 | - | 1.0 → 0.0 → 0.8 | Y |
| 2 | 1.3 → 1.6 | - | 1.4 → 0.4 → 0.8 | Y | 0.8 → 1.6 | - |
| 3 | 1.6 → 1.9 | - | 0.8 → 1.2 | - | 1.6 → 0.6 → 1.4 | Y |
| 4 | 1.9 → 0.9 → 1.2 | Y | 1.2 → 1.6 | - | 1.4 → 2.2 | - |
| 5 | 1.2 → 1.5 | - | 1.6 → 2.0 | - | 2.2 → 1.2 → 2.0 | Y |
| 6 | 1.5 → 1.8 | - | 2.0 → 1.0 → 1.4 | Y | 2.0 → 2.8 | - |
| 7 | 1.8 → 2.1 | - | 1.6 → 2.0 | - | 2.8 → 1.8 → 2.6 | Y |
| 8 | 2.1 → 1.1 → 1.4 | Y | 2.0 → 2.4 | - | 2.6 → 3.4 | - |
| 9 | 1.4 → 1.7 | - | 2.4 → 1.4 → 1.8 | Y | 3.4 → 4.2 | - |
| 10 | 1.7 → 2.0 | - | 1.8 → 2.2 | - | 4.2 → 3.2 → 4.0 | Y |

VCs start to dry up (X = no data to send)

| | VC_1 | SEND? | VC_2 | SEND? | VC_3 | SEND? |
|---|---|---|---|---|---|---|
| 11 | 2.0 → 1.0 → 1.3 | Y | 2.2 → 2.6 | X | 4.0 → 4.8 | X |
| 12 | 0.3 → 0.6 | - | 2.6 → 1.6 → 2.0 | Y | 4.8 → 5.6 | X |
| 13 | 0.6 → 0.9 | N | 2.0 → 2.4 | X | 5.6 → 6.4 | X |
| 14 | 0.9 → 1.2 | - | 2.4 → 2.8 | - | 6.4 → 5.4 → 6.2 | Y |

Figure 12

PEAK CELL RATE 130

| Iteration | SCR Step Sum<br>SCR Step Size = .4 | PCR Step Sum<br>(limit 1)<br>PCR Step Size = .6 | New PCR Step Sum<br>(limit 2) |
|---|---|---|---|
| VC is blocked. | | | |
| 1 | 0.4 | 0.6 | 1.2 |
| 2 | 0.8 | 1.2 | 1.8 |
| 3 | 1.2 | 1.8 | 2.0 |
| 4 | 1.6 | 2.0 | 2.0 |
| 5 | 2.0 | 2.0 | 2.0 |
| 6 | 2.4 | 2.0 | 2.0 |
| 7 | 2.8 | 2.0 | 2.0 |
| 8 | 3.2 | 2.0 | 2.0 |
| 9 | 3.6 | 2.0 | 2.0 |
| 10 | 4.0 | 2.0 | 2.0 |
| 11 | 4.4 | 2.0 | 2.0 |
| 12 | 4.8 | 2.0 | 2.0 |
| VC is no longer blocked. | | | |
| 13 | 5.2 → 4.2 | 2.0 → 1.0 | 1.6 |
| 14 | 4.6 → 3.6 | 1.6 → .6 | 1.2 |
| 15 | 4.0 → 3.0 | 1.2 → .2 | 0.8 |
| 16 | 3.4 | .8 | 1.4 |
| 17 | 3.8 → 2.8 | 1.4 → .4 | 1.0 |
| 18 | 3.2 → 2.2 | 1.0 → 0 | 0.6 |
| 19 | 3.6 | .6 | 1.2 |
| 20 | 3.0 → 2.0 | 1.2 → .2 | 0.8 |
| 21 | 2.4 | .8 | 1.4 |
| 22 | 2.8 → 1.8 | 1.4 → .4 | 1.0 |
| 23 | 2.2 → 1.2 | 1.0 → 0 | 0.6 |
| 24 | 1.6 | .6 | 1.2 |
| 25 | 2.0 → 1.0 | 1.2 → .2 | 0.8 |
| 26 | 1.4 | .8 | 1.4 |
| 27 | 1.8 → 0.8 | 1.4 → .4 | 1.0 |
| 28 | 1.2 → 0.2 | 1.0 → 0 | 0.6 |
| 29 | 0.6 | .6 | 1.2 |
| 30 | 1.0 → 0.0 | 1.2 → .2 | 0.8 |

SYSTEM AND METHOD OF SCHEDULING DATA CELLS BASED UPON SUSTAINABLE CELL RATE AND PEAK CELL RATE OVER A VARIABLE BANDWIDTH CHANNEL

BACKGROUND

1. Field of the Invention

The present invention relates generally to a system that allocates bandwidth on a network connection and, more specifically, to both a method and system of implementing a sustainable cell rate and a peak cell rate which dynamically allocate bandwidth on a variable bandwidth channel, allowing an idle channel to shift bandwidth to a busy one.

2. Description of the Related Art

Since the invention of computers, engineers have developed methods and apparatus to enable separate computers to communicate with each other. The benefits of inter-computer communication include such common functions as file, hardware and software sharing. More recently, the Internet, a vast collection of interconnected computers, has revolutionized communication between computers enabling networks that span the globe.

The processing power of a computer has always been important to engineers and computer users and, as computers have become increasingly interconnected, bandwidth has also become very important. Bandwidth is a measure of the capacity of a communication link, often expressed in bits per second, or bps. Bandwidth depends not only on a particular communication medium, such as fiber optics, coaxial cable, or twisted pair, but also on a communication protocol employed. A communication protocol is a collection of rules that two or more computers or devices employ to exchange data.

Several wide area protocols have been developed; two prominent examples are the Transmission Control Protocol/Internet Protocol (TCP/IP) and Asynchronous Transfer Mode (ATM). TCP/IP is a packet based protocol. In a packet-based protocol, data is divided into multiple chunks, or packets, and each packet is addressed and transmitted through a communication medium. TCP/IP is flexible in that individual packets that are part of the same data stream may take different routes to the same destination. Thus, a source computer, an intermediate computer, or "router," and a destination computer, can adjust to communication medium congestion or failure by rerouting packets through alternative routes. In fact, individual packets within a single data stream may take different routes between the source computer and the destination computer. One drawback of TCP/IP is that the address of each packet is resolved at the source, destination and every router in between.

Most communication protocols include layers; the three primarily employed in TCP/IP are a physical layer, a data link layer, and a network layer. At the source computer, the network layer passes packets to the data link layer, the data link layer passes packets to physical layer, and the physical layer writes the packet in the form of electronic bits onto the communication medium. The physical layer is responsible for passing bits onto the connection medium, the data link layer for transmitting data between directly connected computers, and the network layer for routing the data from the source computer to the destination computer, through intermediate computers if necessary.

ATM is a communication protocol of a type know as frame relay. In frame relay, a virtual circuit (VC) is established between applications on different computers. Each chunk of data, or frame, is relayed through the VC. The address resolution function of the network layer is performed only when the VC is first established. The network protocol layer of TCP/IP is therefore not applicable in an ATM transmission after channel setup because it is not necessary to resolve the address of each frame once the VC has been established. Instead, each computer maintains a table of VCs. The table includes such information as VC priority and status data and the appropriate output channel number for each input channel number. In other words, a connection is routed based upon a connection number instead of a network address; each frame is relayed based on information in a table which contains a specific output channel for each input channel. In other words, the source, router and destination computers merely look at the input channel number in a header structure of each data frame and relay the frame to a specific output channel based upon information contained within the table; no other address resolution is necessary and every frame takes the same route in their original order.

There are several categories of service available within an ATM connection. The first is a constant bit rate (CBR) connection. This category of service is appropriate for an application that maintains a steady stream of data such as a video connection that requires not only a fixed bandwidth but also has a precise timing requirement. A second category of service, a variable bit rate (VBR) connection, requires a specific throughput but data is not necessarily sent at strictly defined time intervals. A VBR connection is commonly used for voice or teleconferencing data. A third category of service is an unspecified bit rate (UBR) connection. A UBR connection does not guarantee any throughput level and is commonly used for file transfer. The final category of service is an available bit rate (ABR) connection.

An ABR connection provides a guaranteed minimum capacity and allows data to be "bursted" at higher capacities when there is bandwidth that is not otherwise being utilized.

Some advantages of a frame relay protocol such as ATM over a packet oriented connection such as TCP/IP are less overhead once a connection has been established, the ability to prioritize individual connections, and the data frames of frame relay are, unlike the packets of a packet oriented connection, delivered to the destination in the order they are sent.

In some frame relay protocols each frame is of variable length; in ATM, each frame, also referred to as a cell, is a fixed length, typically 53 bytes. Of the 53 bytes, 48 bytes are typically payload and 5 bytes contain header information such as the number of the VC on which the cell is transmitted.

One advantage of ATM over TCP/IP is that channel priority levels can be defined so that applications such as video streams that have strict timing or data capacity requirements can be accommodated. A segmentation and reassembly (SAR) controller typically guarantees to a VC a predefined sustainable cell rate (SCR), peak cell rate (PCR) or both. The SCR is a measure of the VC's average transmission rate and may be flexible over short intervals so that the SAR controller can average transmission rates among several VCs. The PCR, however, is a measurement of the minimum cell spacing of a particular VC and is typically a fixed limit the SAR controller will not allow the VC to exceed.

One issue arises when the sum of the SCRs of all the VCs on an ATM connection approaches the capacity of the communication medium. Although the total SCRs of the VCs on an ATM connection may be less than the bandwidth of the communication medium, there is no guarantee that enough bandwidth is available over any specific time interval. Also, some applications may be "bursty." In other words, the average cell rate required by the application may not be a good predictor of the communication needs of the application over a specific small interval of time.

Another issue arises when the communication medium is already at full or close to full capacity and a request to add another VC is received. Under the current ATM protocol, the request is either refused or satisfied, which may result in the ATM connection becoming unpredictable and error-prone due to an over-subscription.

SUMMARY OF THE INVENTION

A technique of allocating data cells by a segmentation and reassembly (SAR) controller for transmission on a network connection such as an ATM network connection employs step sizes defining a virtual channel's (VC) needed percentage of overall connection bandwidth to achieve the virtual channel's requested sustainable cell rate (SCR) without exceeding the virtual channel's peak cell rate (PCR). In one embodiment, a VC's SCR step size is defined as the requested SCR divided by the connection's overall maximum cell rate. The VC's PCR step size is defined similarly, but based on the requested PCR.

When a VC is polled for transmission, both a SCR step sum and a PCR step sum of that VC are compared to a threshold. If the SCR step sum exceeds the threshold, this VC has accumulated enough "bandwidth allocation" to send data. If the PCR step sum exceeds the threshold, enough time has elapsed since this VC has sent a cell to avoid exceeding the PCR limit. So if both the SCR step sum and the PCR step sum exceed the threshold, the VC is checked for available data and, if available, the cell is sent. If a cell is sent, then that VC's SCR step sum and PCR step sum are decremented.

Then, the SCR and PCR step sums for each active VC are incremented by that VC's SCR step size and PCR step size respectively. If the SCR step sum then exceeds some maximum "accumulated bandwidth" limit (generally fairly large), it is reduced below that limit. If the PCR step sum exceeds a PCR limit (typically 1), it is reset to that limit. Thus, the SCR step sum allows bandwidth to be "accumulated" for use when other VCs are idle, but the PCR step sum prevents the VC from exceeding its PCR.

Both step sums need not be implemented, and other embodiments may simply employ the SCR step sum. Further, the step sums preferably allow simple integer arithmetic, reducing computation complexity.

As to which VC is polled, this is preferably done on a round-robin basis using a table that has a number of entries for each VC, the number of entries generally proportional to that VC's percentage of bandwidth. A next VC entry is examined each cell cycle, and if that VC has sufficient SCR bandwidth accumulated, PCR "delay time" accumulated, and data available, it sends. If data is not sent, a next VC entry in the list is examined for data to be sent. This is repeated until a VC sends data or the table has been completely searched. The next cell cycle, a next VC entry in the table is examined first.

Further, because a number of entries in a row may be to the same VC, each entry can employ a pointer to the next different VC. Then, if that VC cannot transmit data during a particular cell cycle (either through lack of accumulated bandwidth, PCR constraints, or lack of available data), the SAR skips to the next different VC using the pointer.

Each time a VC is added to or deleted from the SAR, the VC step sums are recalculated and the table is recreated. In an alternative embodiment, both VC step sums may be recalculated and the table recreated when ever the bandwidth of the connection either increases or decreases. The table is created essentially by creating a list of active VCs and then simulating the running SAR. That is, the next VC in the list of active VCs is examined to see if it meets the SCR and PCR bandwidth requirements to send a cell, and if so, that VC is placed as the next entry in the round-robin table. The next VC in the list is examined, and the process is repeated until the table has all its entries. Thus, by simulating operation assuming data is always available, the SCR and PCR step sums of the VCs allow the round robin table to be created based on the "virtual" running of the SAR.

Preferably, at least two tables are employed, one for constant bit rate (CBR) VCs and one for other VCs. The requested bandwidth of the CBR VC table is never allowed to exceed overall available bandwidth, but the bandwidth of the first and second tables together can exceed the available bandwidth. Then, in operation, the first table is examined first, and if no cells are transmitted, the second table can use the surplus bandwidth.

Even if the SAR is oversubscribed, the SCR step sum allows a particular channel to "save up" bandwidth for use when other VCs are inactive because it accumulates bandwidth in excess of the threshold necessary to transmit. Thus, the step sum and threshold approach automatically shifts bandwidth between VCs based on their activity.

Numerous advantages can flow from the disclosed techniques. One advantage is that the techniques may be implemented in software, providing the ability to modify or upgrade devices with less trouble and expense than if they were implemented in hardware. Software implemented devices are also typically less expensive to produce. A further advantage is that network connections with variable bandwidth such as an advanced digital subscriber line (ADSL) connection can dynamically reallocate resources to account for changing conditions.

BRIEF DESCRIPTION OF THE DRAWINGS

A better understanding of the present invention can be obtained when the following detailed description of the invention is considered in conjunction with the following drawings, in which:

FIGS. 6a and 6b are diagrams illustrating how a SAR controller such as the one described in FIG. 4 works with multiple VCs;

FIGS. 10a and 10b illustrate the generation of a transmission table;

FIG. 11 illustrates a utilization of the transmission table of FIG. 10b during cell cycles of a VC;

FIG. 12 illustrates how a PCR step sum prevents a VC from exceeding its PCR even though SCR bandwidth has accumulated in a SCR step sum.

DETAILED DESCRIPTION OF PREFERRED EMBODIMENT

Figure 1A:
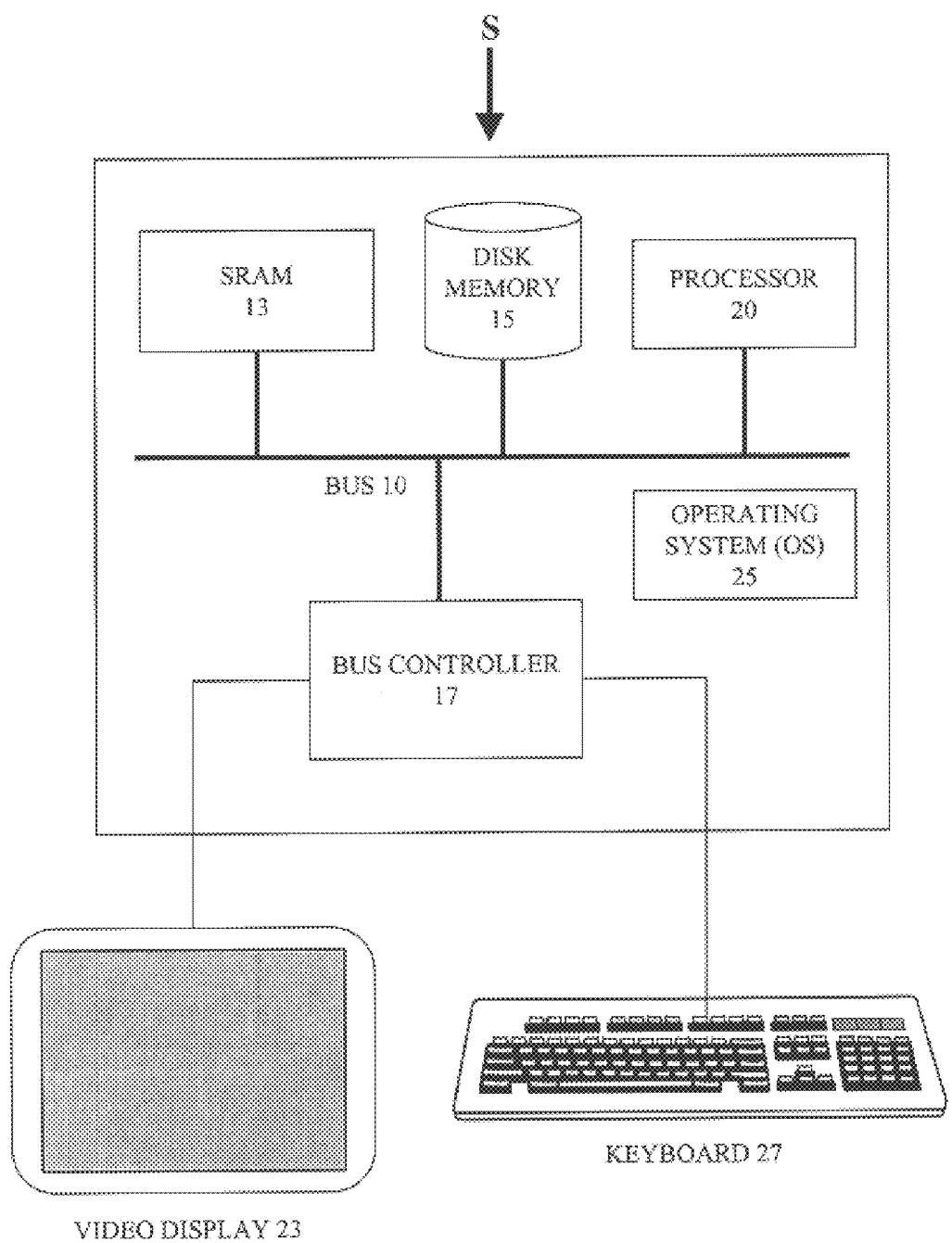
FIG. 1a is a block diagram of a computing system S.

Turning now to FIG. 1a, illustrated is a block diagram of a computing system S that can implement the techniques of the disclosed embodiment. The computing system S includes a bus controller 17, a processor 20, synchronous dynamic access memory (SDRAM) 13 and a disk memory 15. The processor 20, the SDRAM 13 and the bus controller 17 are coupled to a peripheral component interconnect (PCI) bus 10.

The computer system S is controlled by an operating system (OS) 25 which is stored both in the disk memory 15 and the SRAM 13 and executes on the processor 20. A video display 23 and a keyboard 27 are also included in the computer system S, enabling human interaction with the computing system S. It should be understood that the specific processor, bus and other hardware components are not critical to the techniques of the disclosed embodiments and are used as examples only.

Figure 1B:
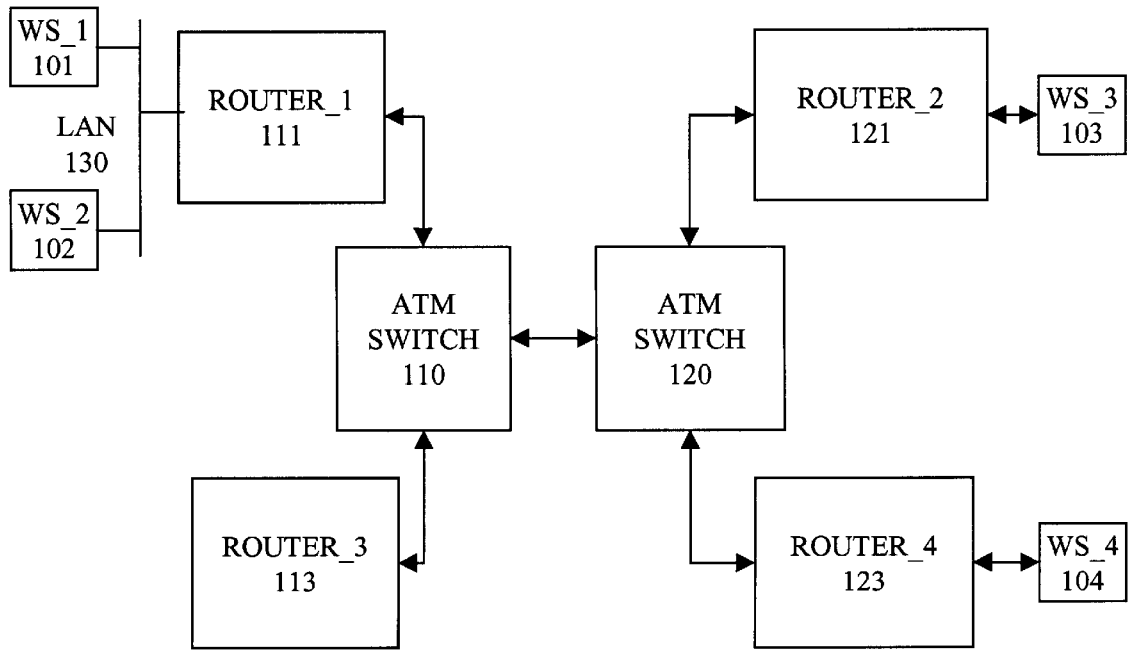
FIGS. 1b and 1c are block diagrams of two exemplary asynchronous transfer mode (ATM) networks.
Figure 1C:
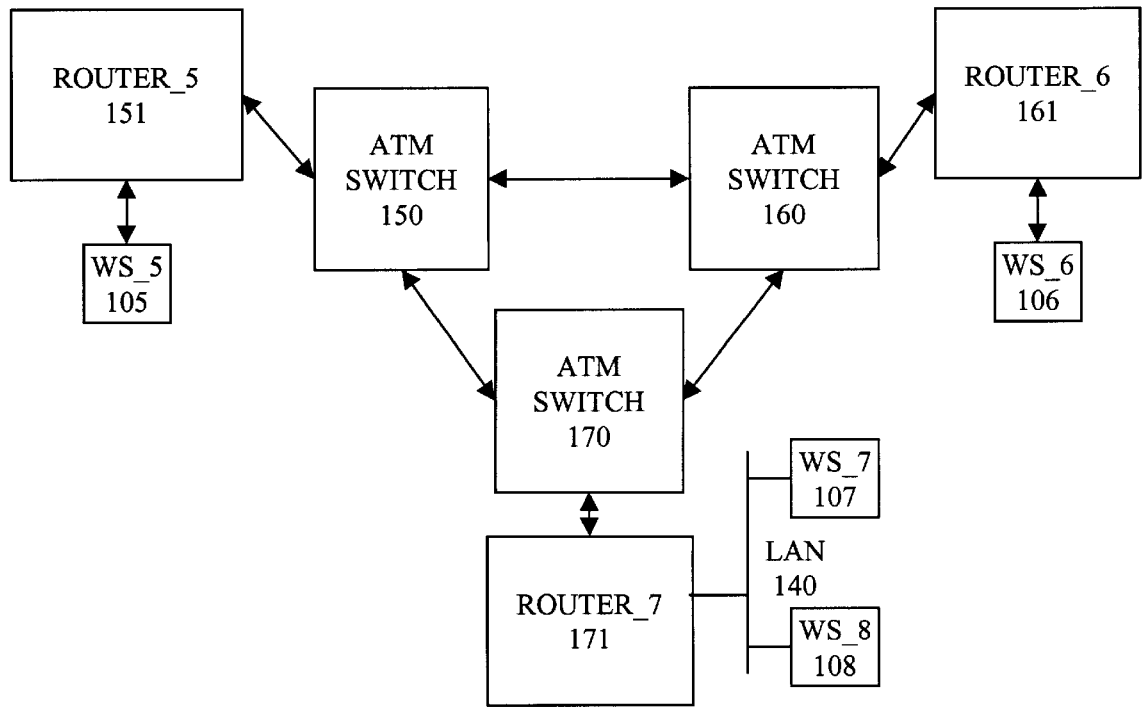

Turning now to the drawings, FIGS. 1b and 1c each show a typical configuration for an asynchronous transfer mode (ATM) network. In FIG. 1b, an ATM switch 110 is connected to a router_1 111 and a router_3 113. A computer WS_1 101 and a computer WS_2 102 are connected to the router_1 111 by means of a local area network (LAN) 130. An ATM switch 120 is connected to a router_2 121 and a router_4 123. A computer WS_3 103 is connected to the router_2 121 and a computer WS_4 is connected to the router 123. The computers 101, 102, 103 and 104 are computing systems similar to computing system S (FIG. 1a). The routers 111, 113, 121 and 123 may be computing system similar to computing system S or, in the alternative may each be a microprocessor specialized for the task of routing data.

WS_1 101 and WS_2 102 can originate messages and may receive from each other messages routed through the router_1 111. WS_3 103 can originate messages and WS_4 104 may receive those messages through router_2 121, relayed by ATM switch 120, and then through router_4 123. WS_4 can also originate messages the are directed to WS_3 103 in a similar manner by employing router_4 123, ATM switch 120 and router_2 121.

In addition, the ATM switch 110 and the ATM switch 120 relay messages between each other, enabling router_1 111, router_2 121, router_3 113 and router_4 123 to pass messages between WS_1 101, WS_2 102, WS_3 103 and WS_4 104.

Turning now to FIG. 1c, illustrated is an ATM switch 150, an ATM switch 160, and an ATM switch 170. A router_5 151 is connected to the ATM switch 150, a router_6 161 is connected to the ATM switch 160 and a router_7 171 is connected to the ATM switch 170. A computer WS_5 105 is connected to router_5 151 and a computer WS_6 106 is connected to router_6 161. In addition, a computer WS_7 107 and a computer WS_8 108 are connected to router_7 by means of a LAN 140. The ATM switches 150, 160 and 170 are also connected to each other enabling the switches 150, 160 and 170 to transmit messages between WS_5 105, WS_6 106, WS_7 107 and WS_8 108 by means of an appropriate router or pair of routers in a manner similar to the process described in FIG. 1b. The computers 105, 106, 107 and 108 are computing systems similar to computing system S (FIG. 1a). The routers 151, 161 and 171 may be computing system similar to computing system S or, in the alternative may each be a microprocessor specialized for the task of routing data.

It should be understood that there are a large number of possible configurations of computers, routers, LANs and switches and that the systems and methods described would apply to many configurations.

Figure 2:
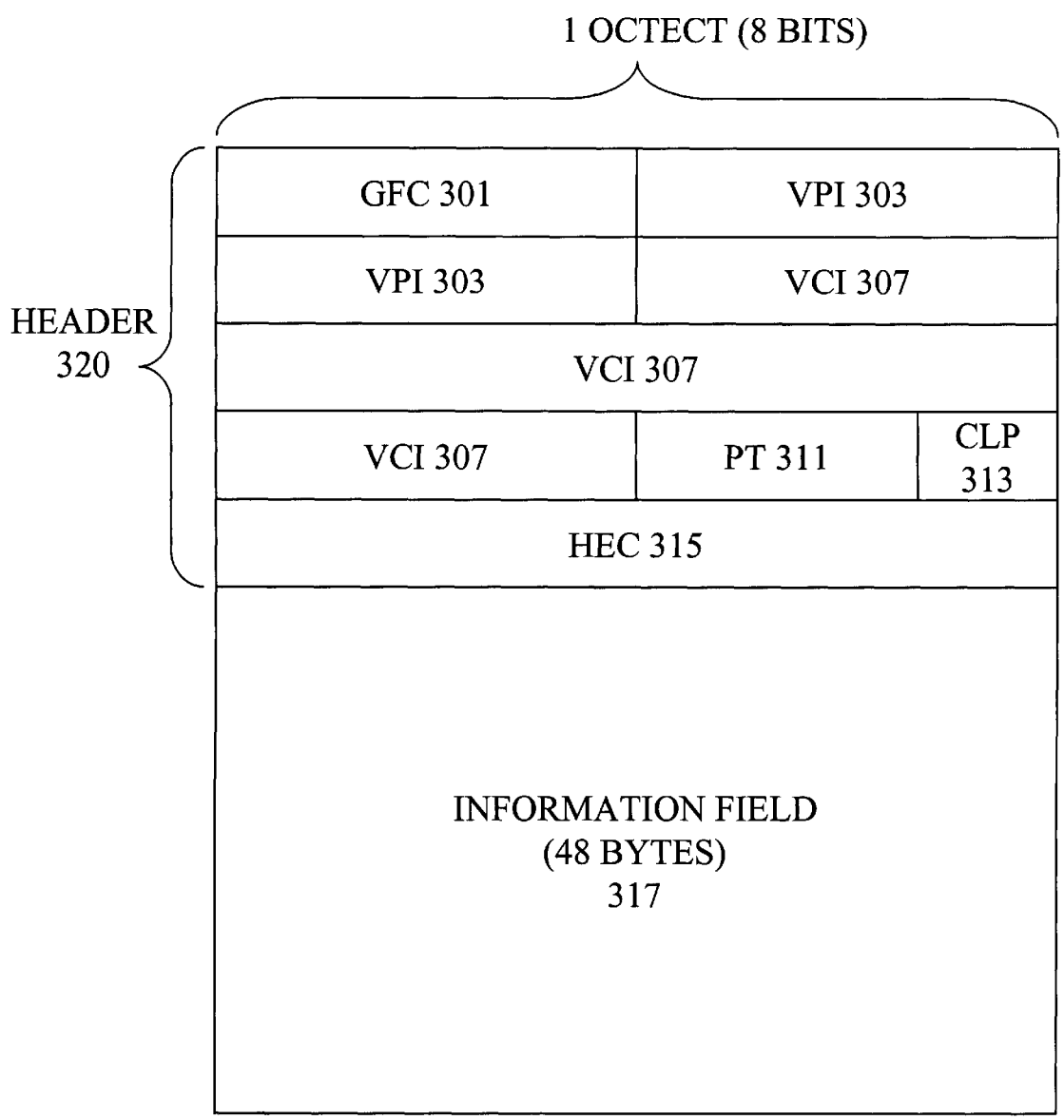
FIG. 2 is an illustration of a typical ATM cell.

Turning now to FIG. 2, illustrated is a typical ATM cell format having a 4-bit generic flow control (GFC) field 301, an 8-bit virtual path identifier (VPI) field 303, a 16-bit virtual circuit identifier (VCI) field 307, a 3-bit payload type (PT) field 311, a cell loss priority (CLP) field 313, an 8-byte header error control (HEC) field 315, and a 48-byte information field 317. Collectively, the GFC 301, the VPI 303, the VCI 307, the PT 311, the CLP 313 and the HEC 315 cover a 5-byte header 220.

The VPI 301 identifies the virtual path to which the cell is associated. The VCI 305 identifies the virtual circuit associated with a specific cell. The PT 311 identifies the type of information field 317 which is contained within the cell. The CLP 313 indicates what should be done with the cell in the event of an overflow. Typically, higher priority cells are retransmitted and lower priority cells are discarded. The HEC 315 contains check sum information that is employed to verify the accuracy of the remaining fields in the header 320 and, in some cases, may provide error correction.

The information field 317 can come in a variety of formats depending upon the type of service requested. The information field typically contains another header field that can vary from 0 to 4 bytes. For example, available services include a constant bit rate (CBR) service, a variable bit rate (VBR) service, an unspecified bit rate (UBR) service and an available bit rate (ABR) service. Each of the exemplary services may format the information field 217 in its own particular manner.

Figure 3A:
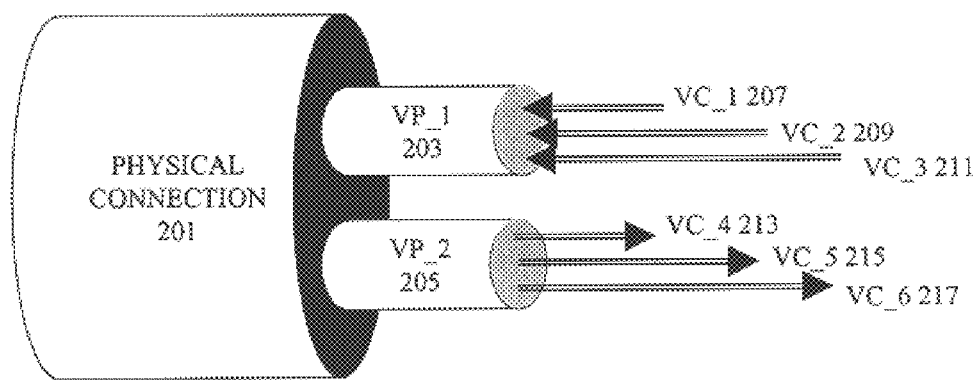
FIG. 3a is an illustration of the logical relationship among a physical connection, virtual paths (VPs) and virtual circuits (VCs) in a typical ATM network.

Turning now to FIG. 3a, illustrate is the logical relationship among physical connections, virtual paths (VPs), and virtual circuits (VCs) in an ATM network. Illustrated is a physical connection 201 having two virtual paths, a VP_1 203 and a VP_2 205. The virtual path VP_1 203 includes three virtual circuits, a VC_1 207, a VC_2 209 and a VC_3 211. The virtual path VP_2 205 is also comprised of three virtual circuits, a VC_4 213, a VC_5 215 and a VC_6 217. Typically, the physical connection 201 makes a direct connection between two devices such as computers, routers or ATM switches like those illustrated in FIGS. 1b and 1c. The virtual paths VP_1 203 and VP_2 205 typically connect two computers and may span multiple physical connections 201. The virtual paths VP_1 203 and VP_2 205 are bundles of VCs following the same route between two computers. It should be noted however that it is possible for a VC to be independent of any VP.

The virtual circuits VC_1 207, VC_2 209 and VC_3 211 provide connections between applications and may span multiple virtual paths and physical connections. In a similar manner, the virtual circuits VC_4213, VC_5215 and VC_6217 each connect applications, possibly across multiple physical paths and physical connections. Typically, individual VCs and VPs are unidirectional.

Figure 3B:
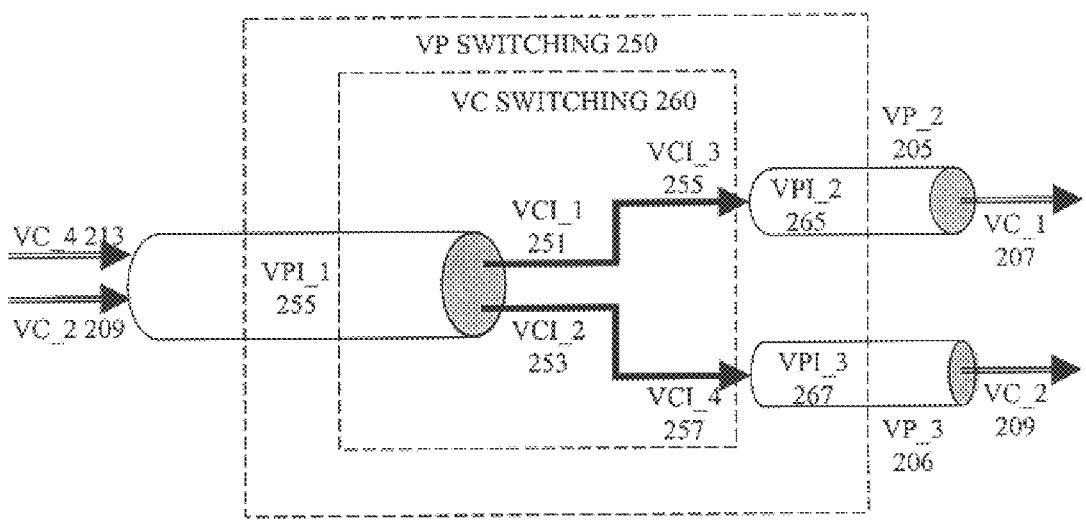
FIG. 3b is an illustration of VC switching and VP switching in an ATM network.

Turning now to FIG. 3b, illustrated are examples of a VP switching 250 and a VC switching example 260. VP_2 205, first shown in FIG. 2a, and a virtual path VP_3 206 are both initially routed by means of a virtual path identifier (VPI) VPI_1 255. The data flow in VP_2 205 is illustrated moving unidirectionally from left to right. In the VP switching example 250, the VP_2 205 is switched from the VPI_1 255 to a different VPI, VPI_2 265.

Figure 4:
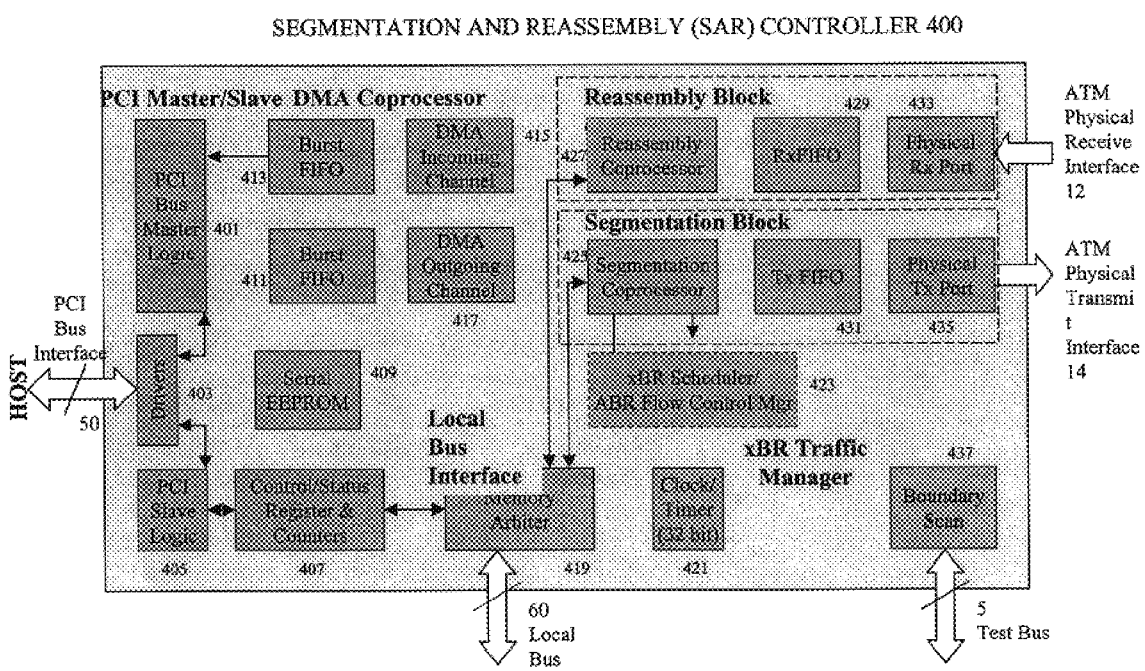
FIG. 4 is a block diagram of an exemplary segmentation and reassembly (SAR) controller.

Turning now to FIG. 4, illustrated is a exemplary segmentation and reassembly (SAR) controller 400. The SAR controller includes peripheral component interconnect (PCI) bus master logic 401, PCI slave logic 405 and PCI drivers 403 that provide an interface between the SAR controller 400 and a PCI bus (not shown) and host processor (not shown). Also included in the SAR controller 400 are control/status registers and counters 407, a serial EEPROM 409, a direct memory access (DMA) incoming channel 415 and a DMA outgoing channel 417. Both the DMA incoming channel 415 and the DMA outgoing channel are coupled to the PCI bus master logic by means of burst FIFOs 413 and 411 respectively. In addition, the SAR controller 400 includes a reassembly block 426 and a segmentation block 424.

The reassembly block 426 includes a reassembly coprocessor 427, a receive (Rx) FIFO 429 and a physical Rx port 433. The segmentation block 424 includes a segmentation coprocessor 425, a transmit (Tx) FIFO 431, a physical Tx port 435 and a xBR scheduler/ABR flow control manager 423. The physical Rx port is connected to an ATM physical Rx interface 12 and the physical Tx port 435 is connected to an ATM physical transmit interface 14.

A memory arbiter is coupled between the control/status registers and counters 407 and both the reassembly coprocessor 427 and the segmentation coprocessor 425. Also included in the SAR controller 400 are a 32-bit clock/timer 421 to provide a system timer and boundary scan logic 437 for testing purposes.

Figure 5:
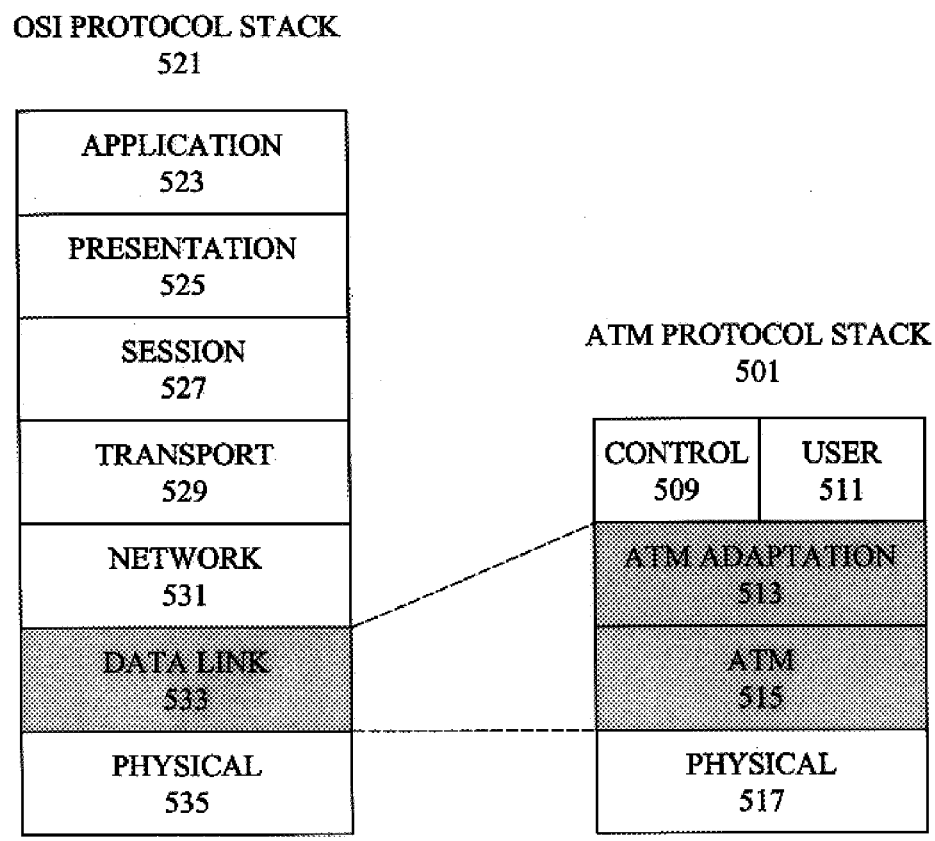
FIG. 5 is a block diagram illustrating the relationship between an ATM protocol stack and an open system interconnection (OSI) protocol stack.

Turning now to FIG. 5, illustrated is an ATM protocol stack 401 and an open system interconnection (OSI) protocol stack 521. The OSI stack 521 is a protocol standard developed by the International Standards Organization (ISO) located in Geneva, Switzerland. The top layer in the OSI protocol stack 521 is an application layer 523. An application such as e-mail, file transfer or a client/server application originates and receives messages through the application layer 523. The application layer 523 formats the message and passes it to a presentation layer 525 which processes the message into a user specified syntax such as the syntax necessary for data encryption. When finished, the presentation layer 525 passes the message to a session layer 527 which is responsible for monitoring starts, stops and governs transmission order. Next, a transport layer 529 is responsible for ensuring delivery of a complete message. The transport layer 529 then passes the complete message on to a network layer 531 which routes the data to the correct network. The next layer to receive the message is a data link layer 533 which is responsible for transmitting the data from node to node. The bottom and final layer is a physical layer 535 which is responsible for passing the bits on to the physical connecting medium.

The TCP/IP protocol deals with the data link 533 and the network layer 531. At each "hop" in a connection, a TCP/IP packet is received at the physical layer 535, passed to the data link layer 533 where the single hop transmission is controlled and then passed to the network layer 531 where the packet's address is decoded and the packet's next appropriate hop is determined. After placing information into the header to specify the next hop, the network layer 531 passes the packet back to the data link layer 533 which places control information into the packet to ensure the accuracy of the next network layer 532 specified next hop. The data link layer 533 passes the packet back to the physical layer 535 which formats the bit into a specific bit pattern appropriate for the physical transmission media. Typically the physical layer 535 may frame each byte with start, stop and parity bits, or some combination of the three.

The ATM protocol stack 501 is has a physical layer 517, an ATM layer 515, an ATM adaptation layer 513, a control layer 509, and a user layer 511. The physical layer 517 corresponds to the physical layer 535 of the OSI protocol stack 521. The ATM layer 515 and the ATM adaptation layer 513 correspond roughly to the data link layer 533 of the OSI protocol stack 521.

The control layer 509 of the ATM protocol stack 501 is responsible for setting up an ATM connection. The user layer 511 handles the communication of ATM cells once the control layer 509 has established the connection.

Turning now to FIG. 6a, illustrated is how a SAR controller like the one described above in conjunction with FIG. 4 handles multiple VCs. In this example, a traffic shaping scheme 605 includes three VCs, a VC_1 610, a VC_2 612, and a VC_3 614. VC_1 610 has been allocated 20% of a virtual path VP_1 620; VC_2 612 has been allocated 20% of the virtual path VP_1 620; and, VC_3 614 has been allocated 60% of the virtual path VP_1 620 based upon the value of either their respective sustainable cell rates (SCR) or peak cell rates (PCR). A SCR represents an average required transmission rate of a VC and a PCR represents the minimum distance a group of data cells within an individual VC can be spaced from each other. If VP_1 620 can transmit 2,000 data cells per second and VC_1 610 requires a SCR of 400 cells per second, then the value of the SCR to the total ATM connection bandwidth is 400 divided by 2,000, or 20%. A value based upon a PCR value may be calculated in a similar fashion. VC_1 610 contains three data cells to be transmitted, P-1, P-2 and P-3. VC_2 612 contains two data cells to be transmitted, Q-1 and Q2. VC_3 614 contains five data cells to be transmitted, R-1, R-2, R-3, R-4 and R-5.

Turning now to FIG. 6b, illustrated is the traffic shaping scheme 605 described above in conjunction with FIG. 6a after six data cells have been transmitted, or six data cell cycles. The first data cell transmitted is R-1, possibly because VC_3 614 has a higher priority than either VC_2 612 or VC_1 610. The second data cell transmitted is P-1 of VC_2 612; the third data cell transmitted is R-2 of VC_3 614; the fourth data cell transmitted is R-3 of VC_3 614; the fifth data cell transmitted is Q-1 of VC_2 612; and, finally, the sixth data cell transmitted is P-2 of VC_1 610. Note that of the first five data cells transmitted one is from VC_1 610, one is from VC_2 612 and three are from VC_3 614. This corresponds to the 20%/20%/60% allocation of VP_1 620 among VC_1 610, VC_2 612 and VC_3 614 respectively. The one of five ratio of VC_1 610 and VC_2 612 and the three of five ratio of VC_3 614 corresponds to either the SCR or the PCR of the respective VCs. In this example, the PCR of VC_3 614 is adjusted so that R-2 and R-3 can be adjacent and VC_3 614 can utilize three of the first four data cell cycles. The SCR is typically flexible and the PCR is typically not.

Figure 7:
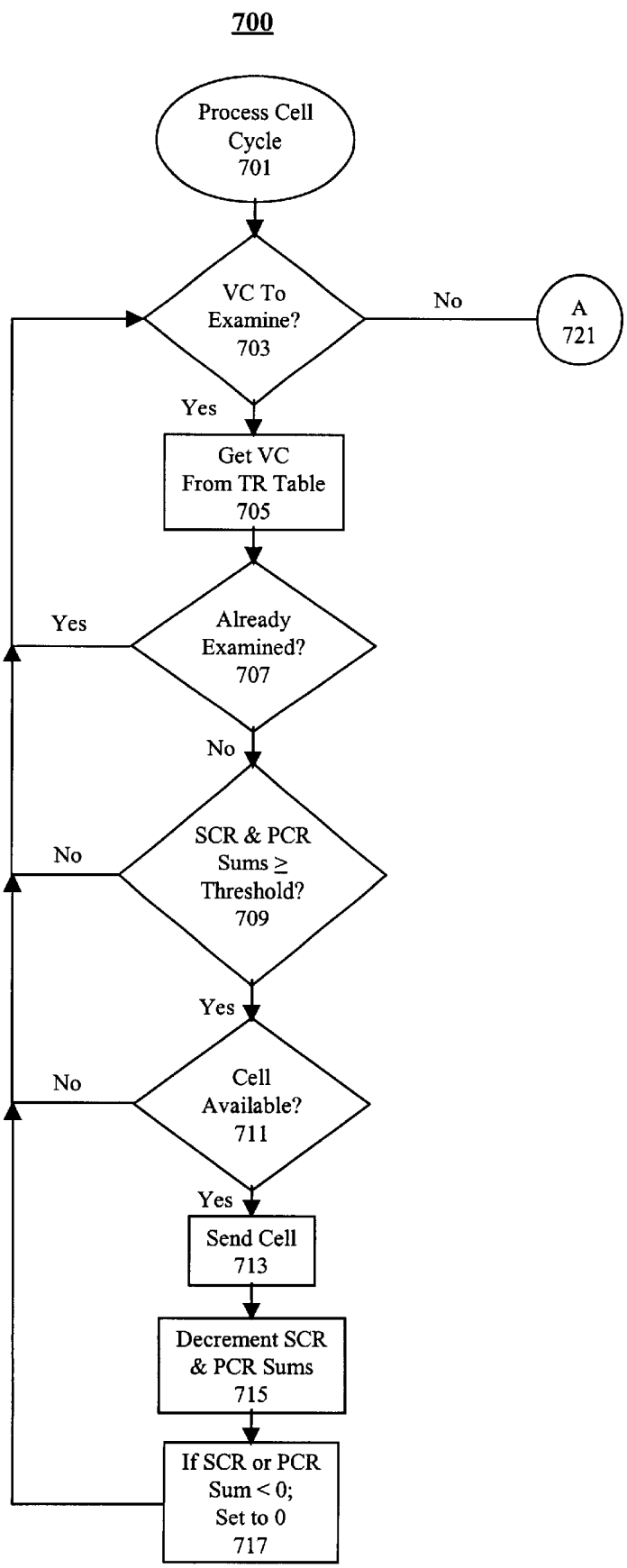
FIG. 7 is a flowchart of an exemplary process during one cell cycle of the described embodiment.

Turning now to FIG. 7, illustrated is a flowchart of a "Process Cell Cycle" process 700 that occurs once per cell cycle of the connection of the disclosed embodiment. In the disclosed embodiment, process 700 is stored in the SDRAM 13 and executed in the processor 20 of the computing system S (FIG. 1a). Alternatively, process 700 may be stored in the EEPROM 409 and executed in the segmentation coprocessor 425 and the xBR scheduler/ABR flow control manager 423 of the SAR controller 400 (FIG. 4). Process 700 begins in a "Process Cell Cycle" step 701 and control proceeds immediately to step 703 where a transmission table 110 (FIG. 10b) is consulted to determine whether there is a VC available to process. The transmission table 110, its use and creation are described in more detail below in conjunction with FIGS. 10a, 10b and 11.

If there are no VCs to examine, then control proceeds to a step A described in more detail below in conjunction with FIG. 8. Once a specific VC is selected, control proceeds to step 705 where the process 700 determines whether the VC has already been examined within the current cell cycle. If the VC has already been examined, there is not need to examine it again. In that case, in the disclosed embodiment, a pointer stored in the transmission table in conjunction with the VC's listing in the transmission table 110 points to a next listing that contains a VC different than the selected VC. In another embodiment, a list of all VCs polled within a cell cycle may be maintained and a listing can be selected that contains a VC both different than the selected VC and that has not been polled previously within the current cell cycle. Control returns to step 703 where again the process 700 determines whether there is another VC to process and the process 700 repeats.

If in step 707, the selected VC has not been polled, then control proceeds to step 709 where a SCR step sum and a PCR step sum are compared to a threshold value. If both the SCR step sum and a PCR step sum are greater than or equal the threshold value control proceeds to step 709 where the process 700 determines whether the VC has a data cell to transmit. If the VC has a data cell to transmit, then control proceeds to step 713 where the data cell is sent, and then to step 715 where both the SCR step sum and the PCR step sum are decremented, typically by the amount of the threshold value. Next, control proceeds to step 717 where the SCR step sum is set to zero if it is less than zero. In step 717, the PCR step sum is also set to zero if it is less than zero. Control then proceeds to step 703 where the process repeats.

If in step 709 either the SCR step sum or the PCR step sum are less than the threshold value, control proceeds immediately to step 703. Control also proceeds to step 703 if the specified VC does not have data to send in step 711.

Figure 8:
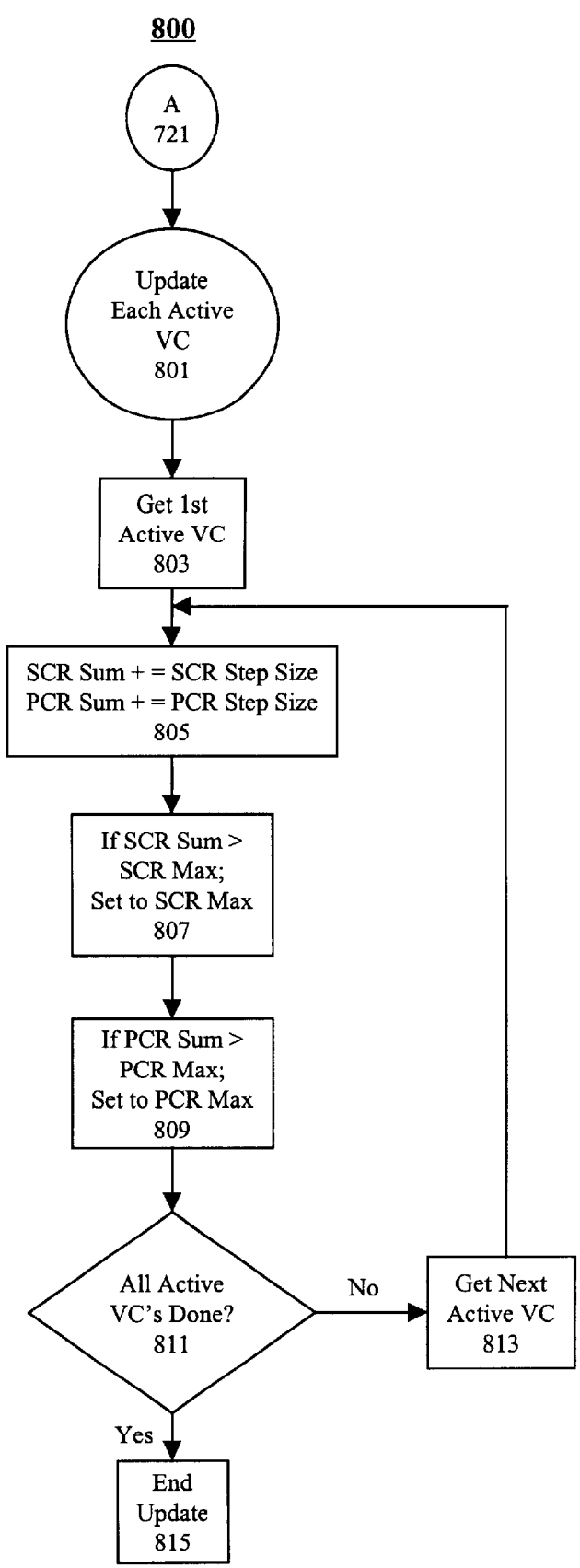
FIG. 8 is a flowchart of an exemplary process to poll a VC.

Turning now to FIG. 8, illustrated is a flowchart of a "Update Active VCs" process 800 that is performed when process 700 reaches stage A as described above in conjunction with FIG. 7. Control begins in step 801 and proceeds immediately to step 803 where a first active VC is selected. Once the first VC is selected, control proceeds to step 805 where the SCR step sum is incremented by the SCR step size and the PCR step sum is incremented by the PCR step size. Control then proceeds to step 807 where, if the SCR step size is greater than a SCR step size maximum, then the SCR step sum is set to the value of the SCR step size maximum. Control proceeds to step 809 where, if the PCR step sum is greater than a PCR step sum maximum, then the PCR step sum is set to the value of the PCR step sum maximum. The SCR step size maximum is typically set to a high number relative to a PCR step size maximum, which is typically set to a low integer value such as '1' or '2'.

After step 809, control proceeds to step 811 where the process 800 determines whether there are more VCs to update. In there are no more VCs to update, control proceeds to step 815 where the Update Active VCs process 800 is complete. If there are more VCs to update in step 811, then control proceeds to step 813 where a next active VC is selected. Control then proceeds to step 805 where the next VC is updated as described above. Process 800 continues through steps 805, 807, 809, 811 and 813 until it is determined in step 811 that all active VCs have been updated.

Figure 9:
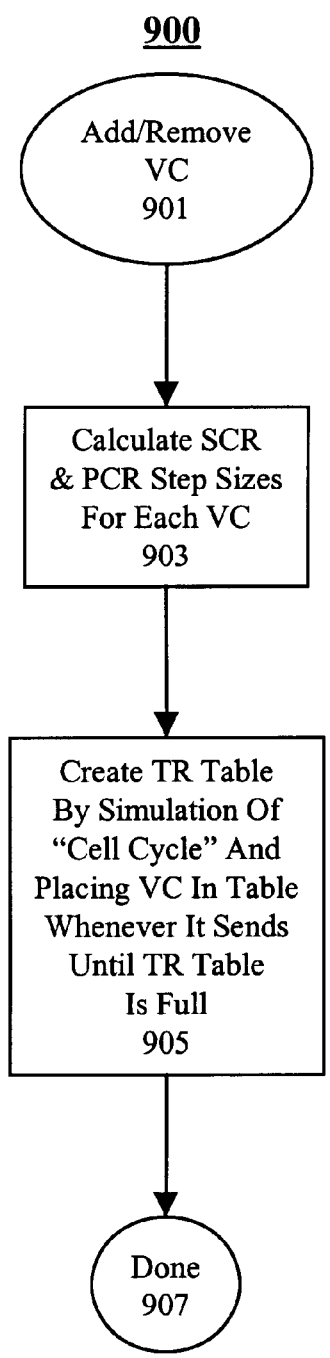
FIG. 9 is a flowchart of an exemplary process to create a transmission table.

Turning now to FIG. 9, illustrated is a flowchart showing a "Add/Remove VC" process 900. Process 900 begins in step 901 and control proceeds immediately to step 903 where a SCR step size and a PCR step size for each VC is calculated. Once these calculations are complete, control proceeds to step 905 where the transmission table described above in conjunction with FIG. 9 is generated. The generation of the transmission table is described in detail below in conjunction with FIGS. 10a and 10b. Once the generation of the transmission table is completed, control proceeds to step 907 where the Add/Remove VC process 900 is complete.

Turning now to FIGS. 10a and 10b which are best described together, FIG. 10a is a table 100 showing values of calculations made during a simulation of several cell cycles of the traffic shaping scheme of the disclosed embodiment. The values of the calculations shown in FIG. 10a are used to generate a transmission table 110 which is shown in FIG. 10b. In the simulation, every VC is assumed to have data ready when ever it is "permitted" to send; however, the VCs do not actually send data during the simulation but instead write their name into a next open position of table 110.

A SCR step sum is initialized for each VC by setting each equal to the corresponding SCR step size, 0.2 for VC_1, 0.3 for VC_2 and 0.5 for VC_3. The simulation then proceeds in a round robin fashion through the active VCs adding the corresponding SCR step size to each SCR step sum and determining, if this were not a simulation, whether the corresponding VC would send. If the VC would send, its name is placed in the next available position of table 110.

During the first iteration the value of the SCR step sum of VC_1 is initialized to the value of the SCR step size of VC_1, or 0.3. Next, if the value of VC_1's SCR step sum is greater than or equal to a threshold value, in this example 1.0, the name "VC_1" would be placed into the table at the next available position, or position 1. In this case, the SCR step sum is less than the threshold valus so no entry is made into the table. The final calculation for VC_1 in this iteration is adding the value of the VC_1's SCR step size to VC_1's SCR step sum.

Moving to the next VC, VC_2, the SCR step sum is initialized to 0.3, which is the value of VC_2's step size, and the SCR step sum is compared to the threshold value. Since the SCR step sum is less than the threshold, no entry is added to the transmission table. VC_2's SCR step size is then added to VC_2's SCR step sum. Next, the same calculations are performed for VC_3 with the same results. Having processed each VC, the generation moves to a second iteration. In iteration 2, VC_1 and VC_2 are processed again with the same results. Next the calculations move to VC_3 which has a SCR step sum, 1.0, which is greater than or equal to the threshold value. If this were not a simulation, VC_3 would be permitted to send but instead the name "VC_3" is placed in the transmission table 110 at the next available position, which is position 1. The calculations then continue on as described above.

Moving on to iteration 3, since no VC meets the criteria for sending, no names are added to table 110. In iteration 4, first VC_2 meets the criteria and the name "VC_2 is added to table 110 at position 2. In this iteration, VC_3 also meets the criteria and the name "VC_3" is written into table 110 at position 3.

Continuing on in the same manner, the name "VC_1" is written into table 110 at position 4, the name "VC_3" at position 5, "VC_2" at position 6, "VC_3" at position 7, "VC_1" at position 8, "VC_2" at position 9 and, finally, the name "VC_3" is written into the table at position 10, filling out this exemplary transmission table.

In order to make the calculations of step sizes and step sums computationally more efficient, integer arithmetic is employed. In other words, fraction values for step sizes are shifted up to integer values, as are the corresponding threshold values. For example, using decimal values, a step size of 0.5 wold be shifted one decimal point to 5.0 and a corresponding threshold value of 1.0 would then become 10.

Turning now to FIG. 11, illustrated is the use of the transmission table 110 in conjunction with the SCR step sums and SRC step sizes to determine which VC should be permitted to send a data cell when a connection is over subscribed. For simplicity, this description of omits the PCR step sum calculations based upon the PCR step size because they are similar to the calculations for the SCR step sum based upon the SCR step size. The total of the SCR step sizes in this example is 1.5 (0.3+0.4+0.8) which indicates that this connection is 50% over subscribed.

At the start of this example, every VC is assumed to have data to transmit and every SCR step sum is initialized to the threshold value. The first VC polled is VC_3 because it is listed first in the transmission table 110. Since its SCR step sum is greater than or equal to the threshold value, VC_3 is allowed to send a data cell as indicated by a "Y" in the corresponding "Send" column. VC_3's step sum is decremented by the threshold value and the SCR step sums of each VC in the connection is incremented by the corresponding SCR step size. In each iteration, one VC is permitted to transmit because each iteration corresponds to one cell cycle.

Next in iteration 2, VC_2 is polled because it is listed in the next position in table 110, position 2. Because is meets the criteria, it is permitted to send; its SCR step sum is decremented; and, the SCR step sum of each VC is incremented by the corresponding SCR step size. The VCs continue to send in the order that they are listed in the transmission table 110 through iteration 10.

As can be seen in this example, the transmission table 110 rotates the polling order in order to proportionally share the available bandwidth when the bandwidth is over subscribed. Until now in this example, it was assumed that each VC had data to transmit provided that the other criteria for transmission were met. It should be noted that on the over subscribed connection of this example the VCs were permitted to transmit in proportion to their SCRs. None of the VCs received the cell cycles they had requested but the cell cycles were allocated on a pro rate basis.

Beginning in iteration 11, each VC does not necessarily have data to send even though it meets all the other criteria (its name is in the current position of the table 110 and its SCR step sum is not less than the threshold). Having allowed VC_3 whose name is listed in position 10 of table 110 transmit data during iteration 10, VC_3 is also has the next opportunity because it is listed in position 1 of table 110. In other words, the polling list is repeated from the top once it reaches the end. In this example, however, VC_3 does not have a cell to transmit as indicated by a "X" in the corresponding Send column.

The next VC listed in table 110, position 2 is VC_2 and it also does not have data to send. Even though VC_3 is listed next in position 3 of table 110, there is no need to check it again because it was just checked. In the disclosed embodiment, a pointer (not shown) corresponding to a specific row in table 110 specifies a next row that does not repeat the VC listed in the specified row and the calculations can proceed directly to the next row that contains a VC that is different form the one that has just been checked and determined not ready to transmit. In this example, the next row that is different is position 4 which contains VC_1. Finally, all criteria are met and VC_1 transmits a data cell. In an alternative embodiment, a list of VCs that have been polled within a specific iteration or cell cycle is maintained, and time and processing is saved by skipping directly to a VC that has not yet been polled within the specific iteration.

In iteration 12, VC_3 is polled because it is listed in position 5 of table 110 and, once again it is not ready. VC_2 is then polled because it is listed in position 6. This time VC_2 meets the criteria and sends a data cell.

In iteration 13, VC_3, listed in position 7, is not ready to send so VC_1, listed in position 8, is polled. In this case, VC_1 may have data but it is not permitted to transmit because its SCR step sum is less than the threshold value. VC_2, listed in position 9 of table 110, is polled and is not ready to send. Now, all three VCs in this example have been polled and are either unable to make the threshold requirement or do not have data to send. In the disclosed embodiment, iteration 13 would pass without a data cell being transmitted. In an alternative embodiment, a second pass can made using either a reduced threshold value or a "scaled" SCR step sum in order to permit a VC to transmit and thus avoid a wasted cell cycle.

Finally in iteration 14, VC_3, listed in position 10 of table 110, is polled and, after meeting all the criteria, is permitted to transmit a data cell.

Turning now to FIG. 12, illustrated is a PCR table 130 that shows how implementing a maximum limit on a PCR step sum can enable a VC to "catch up" to a SCR allotment of data cells without exceeding its PCR allotment. The VC's SCR step size is 0.4, which indicates that this VC should typically utilize 40% of the bandwidth of its connection. The VC's PCR step size is 0.6 indicating that this VC is typically not permitted to utilize more than 60% of the bandwidth of the connection.

In iterations 1 through 12, the exemplary VC is blocked, causing its SCR step sum to grow from 0.4 in iteration 1 to 4.8 in iteration 12. The VC's PCR step sum is capped at a PCR step sum maximum value of 2 and, having reached that maximum in iteration 3, is still at that limit at iteration 12.

Beginning in iteration 13, the exemplary VC is unblocked and, because its SCR step sum and PCR step sum are greater than or equal to the threshold value and the VC has data to send, it is allowed to transmit. In iteration 14 and 15, both the SCR step sum and the PCR step sum are greater than the threshold value and the VC is permitted to transmit in those iterations as well. In iteration 16, the SCR step sum is greater than or equal to the threshold value but the PCR step sum, 0.6, is less than the threshold value. It should be noted that absent the condition imposed by the PCR step sum, the VC would be permitted to transmit for approximately the next 8 iterations. Of course, then the PCR of the VC would be exceeded for the next 8 iterations.

In iteration 16, the PCR step sum is less than the threshold value and the VC is prevented from transmitting. From iteration 17 through 29, the PCR step sum is such that the VC transmits in three out of every five cell cycles, or 60% of the time. A sixty percent transmission rate corresponds to the VC's PCR. The data cells that were backlogged during iterations 1 through 12 are eventually transmitted as indicated by the value of the SCR step sum, 0.6, in iteration 29. In iteration 30, both the SCR step sum and the PCR step sum are less than the threshold value and, assuming that the VC has data to send and remains unblocked, the VC will then settle into a transmission rate that is equal the SCR.

It should be noted that in iterations 13 through 15, the VC "bursted" three data cells, exceeding the VC's PCR for that interval. This deviation form the PCR may, depending upon the circumstances, be unacceptable and can be prevented by setting the PCR step sum maximum to a value of 1. During the 30 iterations displayed in table 130, the VC has transmitted 11 times for a SCR of approximately thirty-seven percent, or 0.37. During the iterations 13 through 30, the VC also transmitted 11 times for a rate of sixty-one percent, or 0.61. Therefore, the PCR of the VC was maintained throughout the thirty iterations and the VC was able to clear a backlog of data cells by borrowing data cells from other VCs as explained above in conjunction with FIGS. 10a, 10b and 11.

Figure 13:
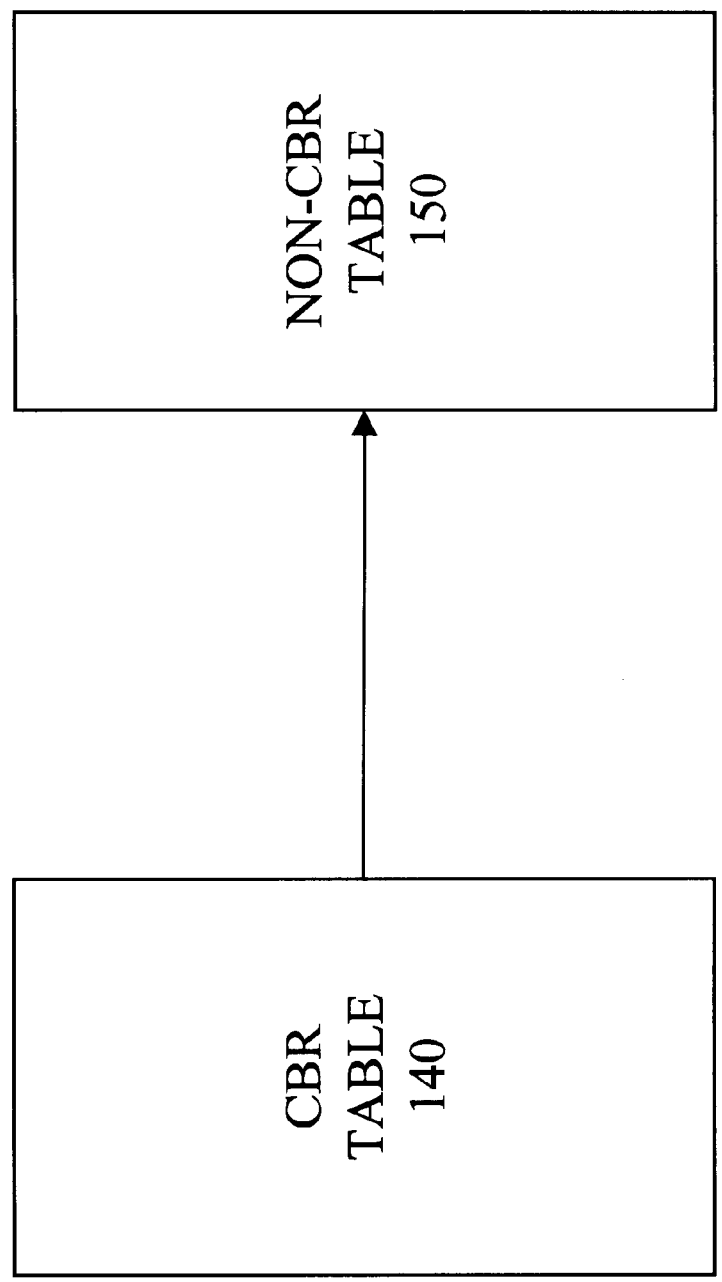
FIG. 13 illustrates a exemplary priority scheme.

Turning now to FIG. 13, illustrated is one priority scheme that can be implemented using the techniques of the disclosed embodiment. A table 140, similar to table 110 described above in conjunction FIG. 11b is generated based on the constant bit rate (CBR) VCs of an ATM connection. VCs using other ATM service types are placed in a table 150. A CBR VC such as a real time video stream is very susceptible to loss of data and timing fluctions. Therefore, the a CBR table is purposely not over subscribed. In this example, the CBR table 140 is under subscribed and the VCs that are entries are polled before any entries in table 150 are polled. In that way, CBR VCs can have guaranteed service and the other VCs can share any remaining bandwidth on a pro rata basis if necessary.

We claim:

1. A method of determining whether to transmit a data cell of a virtual circuit (VC) on a network connection, the method comprising:
   a table generation step comprising the steps of:
      running a simulation of the network connection to determine when each of the plurality of VCs is ready to transmit based upon a SCR step size and a SCR step sum, wherein each VC is assumed to have data available throughout the simulation; and
      adding a listing to the table of each VC that is determined ready to send;
   a transmit determination step comprising the steps of:
      selecting in a round robin fashion a specific VC of the plurality of VCs from the table; and
      comparing a second SCR step sum to a threshold value;
   a transmission step if it is determined to transmit, the transmission step comprising the steps of:
      sending on the network connection the available data cell of the specific VC; and
      decrementing the second SCR step-sum by the threshold value and a update step comprising the step of:
      incrementing the second SCR step sum of each VC by the corresponding SCR step size.

2. The method of claim 1, wherein:
   the transmit determination step further comprises the step of:
      comparing the a PCR step-sum to a second threshold value;
   the transmission step further comprises the step of:
      decrementing the PCR step-sum by the second threshold value; and
   the update step further comprising:
      incrementing the PCR step sum of each VC by a corresponding PCR step size.

3. The method of claim 1, further comprising the step of regenerating the table in response to a change in either the bandwidth of the network connection or an addition of a VC to the plurality of VCs or a deletion of a VC from the plurality of VCs.

4. The method of claim 1, wherein the network connection is an asynchronous transfer mode (ATM) network connection.

5. The method of claim 1, wherein the calculation of the step(s)-are based upon integer arithmetic.

6. The method of claim 1, wherein the method is implemented in software.

7. The method of claim 1, wherein the threshold value is 1.

8. The method of claim 1, wherein the method is performed once per a cell time slot.

9. The method of claim 1, wherein the VCs in the table are constant bit rate VCs of the plurality of VCs and a second table comprises listings of non-CBR VCs.

10. A method of determining whether to transmit a data cell of a virtual circuit (VC) on a network connection, the method comprising:
   a calculation step comprising the step of:
      adding a sustainable cell rate (SCR) step size of a virtual circuit (VC) to
      a SCR step sum of the VC;
   a transmit determination step comprising the step of:
      comparing the SCR step sum to a threshold value; and
   a transmission step if it is determined to transmit, the transmission step comprising the steps of:
      sending on the network connection a data cell of the VC; and
      decrementing the SCR step-sum by the threshold value.

11. The method of claim 10, wherein:
   the calculation step further comprising the step of:
      adding a Peak cell rate (PCR) step size of the VC to a PCR step sum of the VC;
   the transmit determination step further comprising the step of:
      comparing the PCR step sum to a second threshold value; and
   the transmission step further comprising the step of:
      decrementing the PCR step sum by the second threshold value.

12. The method of claim 10, wherein the network connection is an asynchronous transfer mode (ATM) network connection.

13. The method of claim 10, wherein the calculation of the step(s)-are based upon integer arithmetic.

14. The method of claim 10, wherein the method is implemented in software.

15. The method of claim 10, wherein the threshold value is 1.

16. The method of claim 10, wherein the method is performed once per a cell time slot.

17. A segmentation and reassembly (SAR) controller, comprising:
   a co-processor;

a memory coupled to the co-processor; and logic stored in the memory for execution on the co-processor, the logic comprising:

table generation logic, comprising:

logic for running a simulation of the network connection to determine when each of the plurality of VCs is ready to transmit based upon a SCR step size and a SCR step sum, wherein each VC is assumed to have data available throughout the simulation; and logic for adding a listing to the table of each VC that is determined ready to send;

transmit determination logic, comprising:

logic for selecting in a round robin fashion a specific VC of the plurality of VCs from the table; and logic for comparing a second SCR step sum to a threshold value;

transmission logic, comprising:

logic for sending on the network connection the available data cell of the specific VC; and logic for decrementing the second SCR step-sum by the threshold value; and update logic, comprising:

logic for incrementing the second SCR step sum of each VC by the corresponding SCR step size.

18. The SAR controller of claim 17, wherein:

the transmit determination logic, further comprising:

logic for comparing the a PCR step-sum to a second threshold value;

the transmission logic, further comprising:

logic for decrementing the PCR step-sum by the second threshold value; and the update logic, further comprising:

logic for incrementing the PCR step sum of each VC by a corresponding PCR step size.

19. The SAR controller of claim 17, further comprising logic for performing the step of regenerating the table in response to a change in either the bandwidth of the network connection or an addition of a VC to the plurality of VCs or a deletion of a VC from the plurality of VCs.

20. The SAR controller of claim 17, wherein the network connection is an asynchronous transfer mode (ATM) network connection.

21. The SAR controller of claim 17, wherein the calculation of the step(s)-are based upon integer arithmetic.

22. The SAR controller of claim 17, wherein the threshold value is 1.

23. The SAR controller of claim 17, wherein the logic is performed once per a cell time slot.

24. A segmentation and reassembly (SAR) controller, comprising:

a co-processor;

a memory coupled to the co-processor; and logic stored in the memory for execution on the co-processor, comprising:

calculation logic, comprising:

logic for adding a peak cell rate (PCR) step sum to a PCR step sum;

transmit determination logic, comprising:

logic for comparing a sustainable sell rate (SCR) step sum of a virtual circuit (VC) to a threshold value; and transmission logic, comprising:

logic for sending on the network connection a data cell of the VC; and logic for decrementing the SCR step-sum by the threshold value.

25. The SAR controller of claim 24, wherein:

the calculation logic, further comprising:

logic for adding a peak cell rate (PCR) step size of the VC to a PCR step sum of the VC;

the transmit determination logic, further comprising:

logic for comparing the a PCR step-sum to a second threshold value; and the transmission logic, further comprising:

logic for decrementing the PCR step-sum by the second threshold value.

26. A computing system, comprising:

a processor;

a bus; and a segmentation and reassembly (SAR) controller coupled to the bus, comprising:

a co-processor;

a memory coupled to the co-processor; and logic stored in the memory for execution on the co-processor, the logic comprising:

table generation logic, comprising:

logic for running a simulation of the network connection to determine when each of the plurality of VCs is ready to transmit based upon a SCR step size and a SCR step sum, wherein each VC is assumed to have data available throughout the simulation; and logic for adding a listing to the table of each VC that is determined ready to send;

transmit determination logic, comprising:

logic for selecting in a round robin fashion a specific VC of the plurality of VCs from the table; and logic for comparing a second SCR step sum to a threshold value;

transmission logic, comprising:

logic for sending on the network connection the available data cell of the specific VC; and logic for decrementing the second SCR step-sum by the threshold value and update logic, comprising:

logic for incrementing the second SCR step sum of each VC by the corresponding SCR step size.

* * * * *